Sept. 24, 1968     H. W. LOVE     3,402,702

FRICTION HEAT GENERATOR

Filed July 7, 1967     2 Sheets-Sheet 1

INVENTOR.
HERBERT W. LOVE
BY
*McCormick, Paulding & Huber*
ATTORNEYS

Sept. 24, 1968  H. W. LOVE  3,402,702
FRICTION HEAT GENERATOR

Filed July 7, 1967  2 Sheets-Sheet 2

United States Patent Office 3,402,702
Patented Sept. 24, 1968

3,402,702
FRICTION HEAT GENERATOR
Herbert W. Love, South Coventry, Conn., assignor of fifty percent to William A. Wilson, West Hartford, Conn.
Filed July 7, 1967, Ser. No. 651,868
6 Claims. (Cl. 122—26)

ABSTRACT OF THE DISCLOSURE

The invention comprises a heat generator of the friction type having a casing, a plurality of juxtaposed discs disposed within the casing, alternate discs being rotatable relative to adjacent, non-rotatable discs by a driven shaft journalled within the casing. Each disc is formed with a chamber therein, the chambers of the non-rotatable discs being filled with material of low heat conductivity and the chambers of the rotatable discs being filled with material of high heat conductivity. The frictional surfaces of the non-rotatable discs are formed to provide vertical parallel grooves and the surfaces of the rotatable discs are formed with angularly spaced outwardly radiating grooves to permit more efficient transfer of heat from the discs to a fluid transfer medium within the casing.

Summary of invention

This invention relates to improvements in a friction heat generator of the type which generates heat by relative movement between a plurality of moving and stationary parts arranged in frictional engagement. It is more specifically directed to the use of filler material within chambers in the moving and stationary parts having properties which effect a rapid and efficient development and transfer of heat to a heat transfer medium within the generator.

It is a primary object of this invention to provide a friction heat generator of the type having juxtaposed, alternately arranged heat generating discs adapted to generate heat rapidly and to effect a rapid transfer of the heat so generated to a transfer medium substantially surrounding the heat generating discs. It is a further object of the invention to provide such a device formed with means permitting direct contact between the frictionally engaged, heat generating surfaces of the discs and the heat transfer medium associated therewith, permitting a more rapid and efficient transfer of heat from the discs to the transfer medium.

The drawings show a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
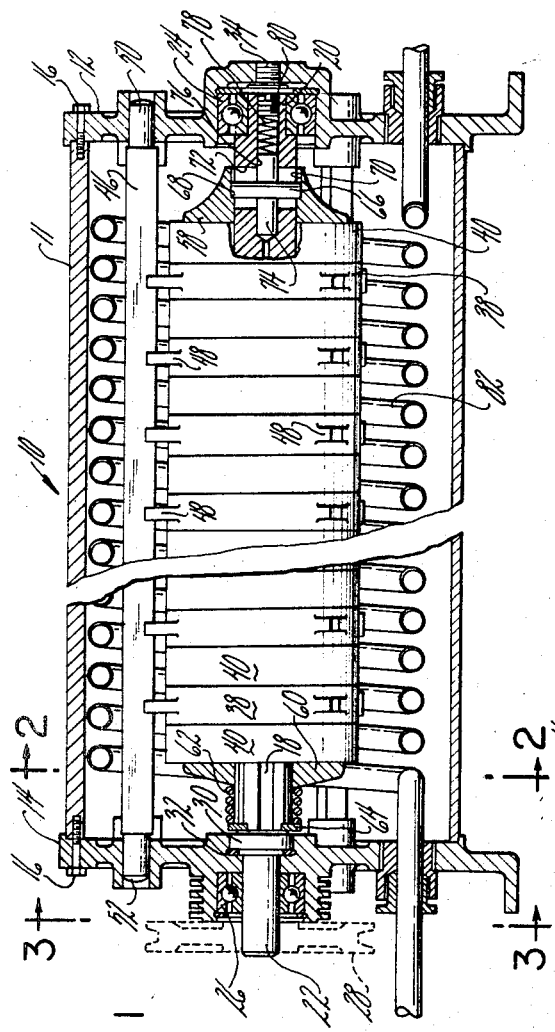
FIG. 1 is a side elevational view in central vertical section of a friction heat generator embodying the present invention, broken away to show indeterminate length.
Figure 2:
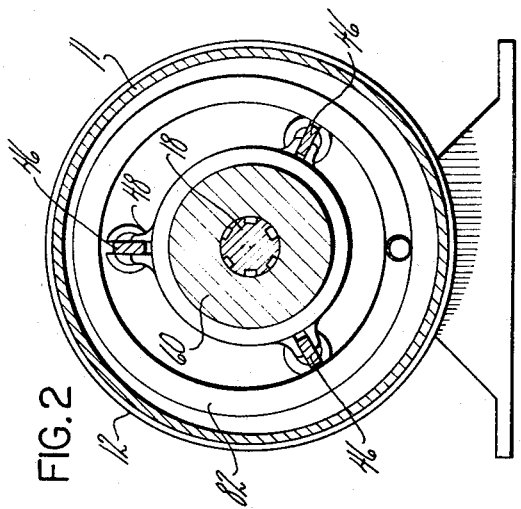
FIG. 2 is an elevational view thereof taken on line 2—2 of FIG. 1.
Figure 3:
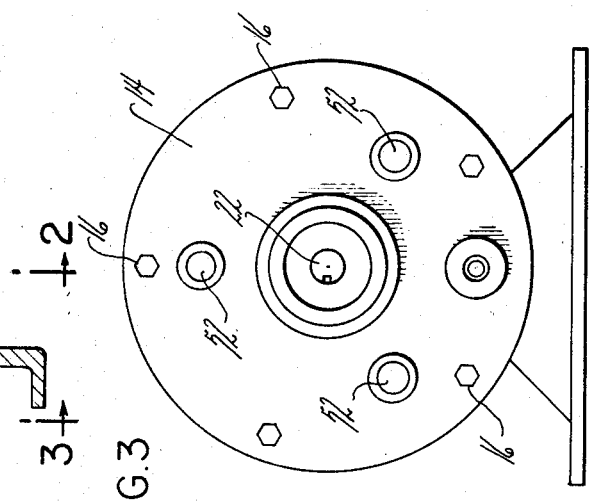
FIG. 3 is an end elevational view taken on the line 3—3 of FIG. 1.

A preferred embodiment of my friction heat generator 10 is shown in FIG. 1 and includes a casing 11 closed at its opposite ends by end plates 12 and 14. The end plates may be secured to the casing in any suitable manner as for example with bolts 16, 16 to effect a liquid-tight seal between the casing and end plates. A drive shaft 18 is arranged within the casing 10 to extend between the end plates 12 and 14 with the opposite ends thereof, 20 and 22, suitably journalled within the end plates 12 and 14, respectively, for rotational movement about its longitudinal axis. Any suitable mounting means may be employed; however, for purposes of illustration, I have shown the opposite ends 20 and 22 of the drive shaft supported by bearings 24 and 26. It can be seen in FIG. 1 that one end of the shaft 18 extends outwardly of the end plate 14 and is adapted to receive a pully or shive 28 by which the shaft may be driven in a conventional manner from a remote power source (not shown) such as an electric motor. It will be understood by those in the art that suitable sealing means is employed to seal the interior of the generator 10 against leakage of fluid and to this end I have shown for purposes of illustration a sealing ring and gasket, 30 and 32, respectively, which surround the end 22 of the shaft mounted in the end plate 14. A sealing plug 34 is provided, as shown in the end plate 12.

An assembly 36 of juxtaposed non-rotatable and rotatable friction discs 38 and 40 respectively are supported within the casing 11 in alternating relationship as shown in the drawings. Each of the discs is centrally apertured to receive the shaft 18 therethrough. An annular aperture 42 in the non-rotatable disc 38 is dimensioned to permit relative rotational movement between the shaft 18 and the disc 38, while the aperture 44 in the rotatable disc 40 is configured and dimensioned to conform to the fluted cross-sectional configuration of the shaft 18 whereby the disc 40 is non-rotatably secured to and supported by the shaft 18 for rotation therewith, and longitudinal, axial sliding adjustment thereon. The disc 38 is non-rotatably supported within the casing 11 upon a plurality of spline bars 46 as shown. The circumferentially spaced pairs of opposed ears 48, 48 function to cooperate with the spline bars to prevent rotational movement of the discs 38 while permitting sliding longitudinal movement on the bars relative to the shaft 18. The opposite ends 50, 52 of the spline bars 46 are each suitably secured in the end plates 12 and 14, respectively, being sealed in a conventional manner to prevent leakage.

The faces 54 and 56 of the discs 38 and 40, respectively, are urged into frictional engagement by pressure plates 58 and 60 carried by the shaft 18 at opposite ends of the disc assembly 36. Each of the pressure plates is secured for rotation with the shaft 18 and axial sliding movement thereon. The pressure plate 60 is urged against the adjacent disc 40 by a spiral compression spring 62 which surrounds the shaft 18 between the plate 60 and a thrust collar or the like 64 which is secured to the shaft 18. Sliding axial movement of the pressure plate 58 is restricted by a pin 66 which extends through the shaft 18, normal to the axis thereof. The projecting ends of the pin 66 act upon an abutment surface 68 formed by a recess 70 in the end of the plate 58 as shown.

A slot 72 in the drive shaft 18 through which the pin 66 extends is dimensioned to permit limited movement of the pin in a longitudinal or axial direction relative to the shaft. A follower 74 is slidably disposed within an axial bore 76 formed in the end 20 of the drive shaft and is biased by compression spring means 78 to force the extending ends of the pin 66 against the abutment surface 68, to bring the pressure plate 66 into abutting engagement with the adjacent friction disc 40. While I have shown the compression spring means 78 as being a conventional compression spring, any suitable compression spring means may be used, as for example, cup-shaped spring discs of the Belleville type.

The force exerted by the spring means 78 may be adjusted by means of the threaded plug 80 for varying the pressure of engagement between the individual friction discs 38 and 40 comprising the assembly 36. The greater the force exerted by the spring means 78, the greater will be the pressure of frictional engagement between the faces of the rotatable and non-rotatable discs.

Those familiar with the art will understand that when the drive shaft is rotated, the rotatable discs 40 will be rotated with the drive shaft 18 and the frictional resistance against relative rotational movement between the adjacent faces of the rotating and non-rotating discs will generate heat. To utilize the heat so generated, heat transfer means is provided for transferring the generated heat to a liquid, gas or the like to be heated. The heat transfer means may take many forms, such as comprising the filling of the interior of the generator 10 with a heat transfer medium such as oil, a solution of distilled water and glycerine, or the like. The transfer medium functions to effect an efficient transfer of the heat generated by the friction discs to the liquid or gas to be heated as it is circulated through a tubular coil 82 secured in a conventional manner within the generator and surrounding the friction disc assembly 38, as shown in FIG. 1. Suitable means (not shown), such as filler ports, are provided in the casing or end plates, as required, to facilitate filling the generator with the heat transfer medium.

Figure 6:
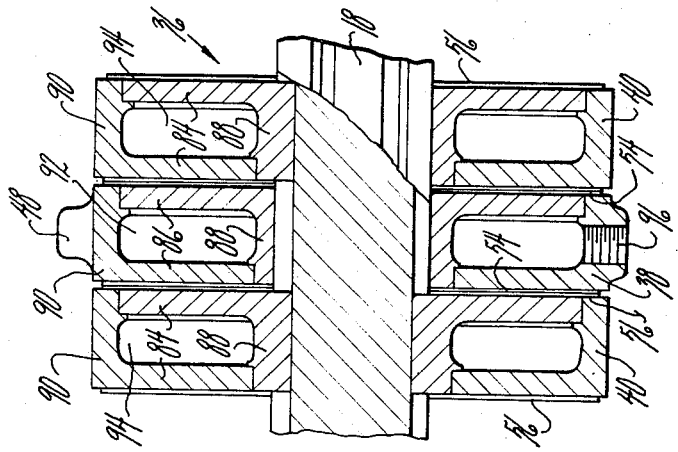
FIG. 6 is an enlarged, fragmentary view in central vertical section showing the juxtaposed, alternating relationship of the rotatable and non-rotatable discs of the present generator illustrating their positioning relative to the driving shaft.

Each of the discs 38 and 40 is formed with opposed, parallel side walls 84, 84 and 86, 86 respectively, spaced apart by inner and outer concentric annular walls 88 and 90, as shown in FIG. 6, forming chambers 92 and 94, respectively, in said non-rotatable and rotatable discs. The discs may be constructed in any conventional manner, but for purposes of illustration, are shown in FIG. 6 as formed of two sections, one section comprising a wall 84 formed integrally with the outer annular wall 90 brazed to another section comprising the other wall 84 formed integrally with the inner annular wall 88. Ports 96 and 98 are provided in the outer wall 90 of each disc, as shown, and communicate with the chamber therein. The port 96 functions as a filler port by which the chamber in each disc may be filled as will be later explained. The port 98 functions as a vent to permit the air to escape as the chamber is being filled.

Figure 5:
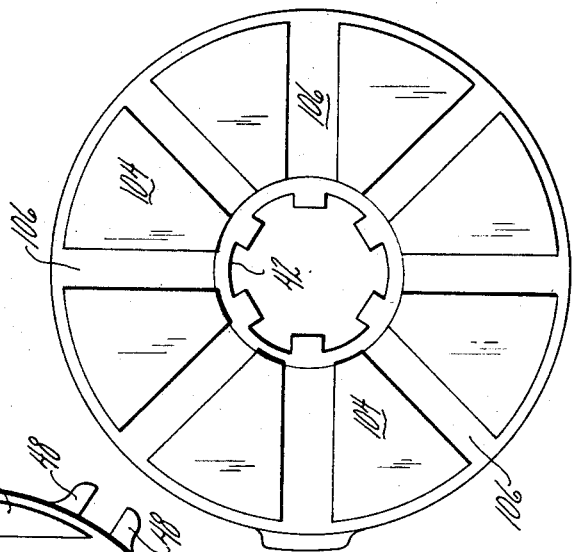
FIG. 5 is a view similar to FIG. 4 but of one of the rotatable discs.
Figure 4:
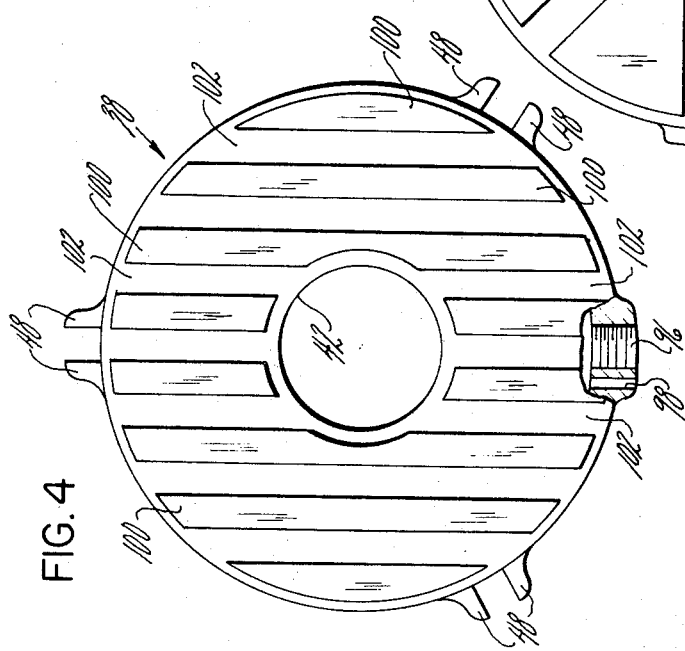
FIG. 4 is an enlarged, elevational side view of one of the non-rotatable discs of the generator of the present invention shown in partial section.

The outer faces 54 and 56 of the side walls 84 and 86 respectively, are each configured as shown in FIGS. 4 and 5 of the drawing to provide areas of frictionally engageable surfaces. The non-rotatable discs 38 are each provided with parallel friction surfaces 100 spaced apart by recessed areas 102; while the rotatable discs 40 have generally wedge-shaped friction surfaces 104, angularly spaced apart by outwardly radiating, recessed areas 106.

The side and inner and outer end walls of the non-rotatable discs 38 are preferably made of a material having a high rate of thermal conductivity, as for example, high content copper alloy such as red brass. The chambers 92 of the discs 38 are each filled with filler material combining the properties of a low specific heat and a low thermal conductivity, such as lead pellets or the like. After filling the chambers 92, ports 96 and 98 are carefully plugged and sealed.

The side and inner and outer end walls of the rotatable discs 40 are preferably made of a material such as high carbon, tool steel, having high thermal conductivity and the chambers 94 are plugged and sealed after being filled with a material characterized by a higher specific heat and a higher thermal conductivity than the material used as a filler in the chambers 92 of the non-rotatable discs, such as particles of copper or the like.

Suitable insulating means (not shown) such as a jacket of asbestos or the like is provided to minimize heat loss through the casing 11 and end plates 12 and 14.

In operation, the shaft 18 is driven by any suitable power source to rotate all of the rotatable discs 40. Friction opposing the relative movement between the abutting faces 54, and 56 of the discs 38 and 40, respectively, will generate heat, the degree of generated heat being relative to the speed of rotation and the pressure applied by the adjustable spring means 78 against the disc assembly 36. The heat so generated will heat the transfer medium surrounding the disc assembly, thus heating the fluid being circulated through the coil 82, submerged within the transfer medium.

The grooves 102 and 106 function to permit direct contact of the transfer medium with the friction surfaces 100 and 104 of the discs 38 and 40 as it flows through the grooves, effecting a more rapid transfer of generated heat from the walls and surfaces of the discs to the transfer medium.

By filling the chambers 92 and 94 with filler materials, as described, wherein alternate discs are filled with a substance having a low specific heat and a low rate of thermal conductivity while the adjacent discs are filled with a filler substance of a type having good thermal conductivity and a higher specific heat, the efficiency of my improved generator is substantially greater than that of conventional friction heat generators. The temperature of the discs may be raised to a higher level more rapidly, and a more efficient transfer of such heat to the transfer medium may be effected. It is thought that one of the reasons for this phenomenon is the flow of heat from one disc to the other, effected by the difference in disc temperature brought about by the differences in specific heat and thermal conductivity of the filler substances. The discs with filler material having the higher specific heat and greater thermal conductivity transfer and radiate the generated heat faster than those having a filler substance of lower specific and lower thermal conductivity since the filler substance is thought to absorb less of the generated heat from the walls of the disc.

As the transfer medium is in direct contact with the friction surfaces and walls of the individual discs as it flows through the grooves 102 and 106, as well as with the outer surfaces of the walls 90, heat from the discs is rapidly and efficiently absorbed by the transfer medium. The heat transfer process continues so long as fluid is circulated through the coil 82, to draw off the heat generated.

What is claimed is:

1. A friction heat generator including a casing and opposed end walls, a drive shaft journaled in said end walls for rotative movement within said casing, a plurality of friction discs supported within said casing and secured against rotation, a plurality of rotatable friction discs supported within said casing and driven by said shaft for rotation therewith, said non-rotatable and rotatable discs being disposed in alternate juxtaposed relation and in abutting, frictional engagement, a heat transfer medium in said generator and operatively associated with said rotatable and non-rotatable discs, said discs each having spaced side walls and inner and outer concentric annular walls forming chambers therein, the chambers of said non-rotatable discs being filled with material having low thermal conductivity, the chambers of said rotatable discs being filled with material having high thermal conductivity whereby upon rotation of said rotatable friction discs, heat generated by the relative movement of the frictionally engaged wall surfaces thereof will elevate the temperature of the walls of the rotatable discs more rapidly than those of the non-rotatable discs and heat will flow to said transfer medium more rapidly from the rotatable discs than from the non-rotatable discs.

2. A friction heat generator as defined in claim 1 wherein the material filling the chambers of the non-rotatable discs has a lower specific heat than the material filling the chambers of the rotatable discs.

3. A friction heat generator as defined in claim 1 wherein the side walls of the non-rotatable discs are provided with means permitting the transfer medium direct contact with said wall surfaces permitting a more efficient transfer of heat therefrom to the transfer medium.

4. The friction heat generator as defined in claim 3 wherein said means comprises a plurality of parallel grooves extending across the faces of the side walls of said non-rotatable discs permitting flow of said transfer medium thereacross.

5. A friction heat generator as defined in claim 4 wherein the rotatable friction discs are provided with side walls formed with angularly spaced, radially extending grooves in the outer faces thereof permitting flow of said transfer fluid therethrough effecting an efficient transfer of heat from the discs to the transfer medium.

6. A frictional heat generator as defined in claim 5 including a heating coil surrounding said rotatable and non-rotatable discs and submerged within said heat transfer medium whereby a fluid passing through said coil may withdraw heat from said heat transfer medium.

References Cited
UNITED STATES PATENTS

| | | | |
|---|---|---|---|
| 248,625 | 10/1881 | Wells | 122—26 |
| 854,720 | 5/1907 | Dawson. | |
| 1,650,612 | 11/1927 | Denniston | 122—26 |
| 3,164,147 | 1/1965 | Love et al. | 126—247 |

CHARLES J. MYHRE, *Primary Examiner.*